June 14, 1938.  J. N. MOWERY  2,120,620
SPRINKLER HEAD
Filed March 27, 1936  2 Sheets-Sheet 1
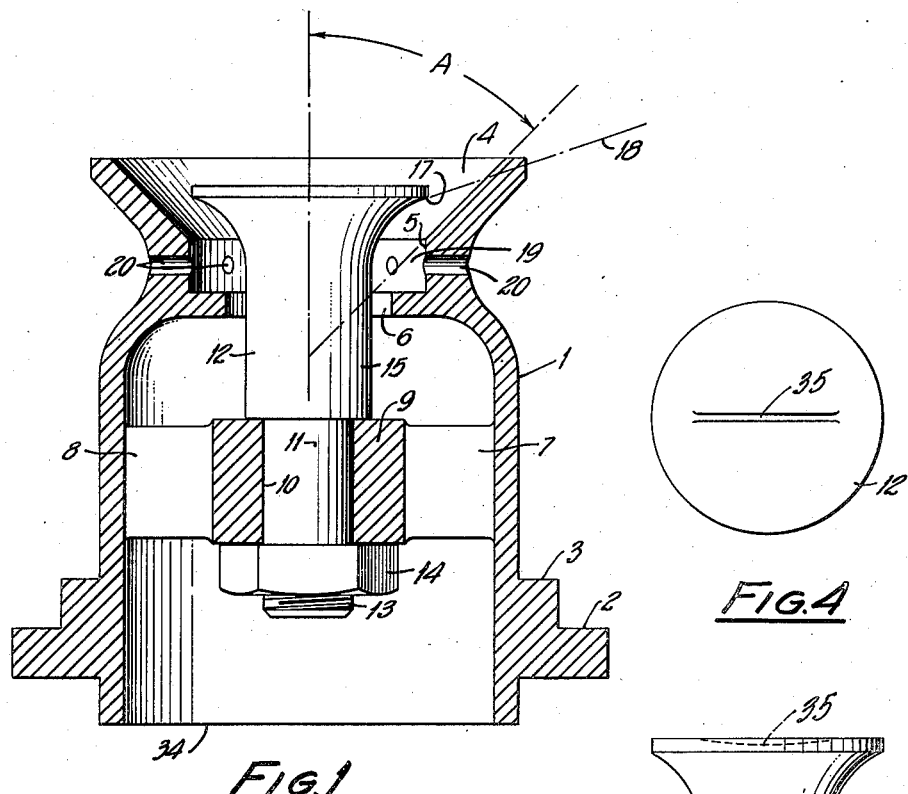
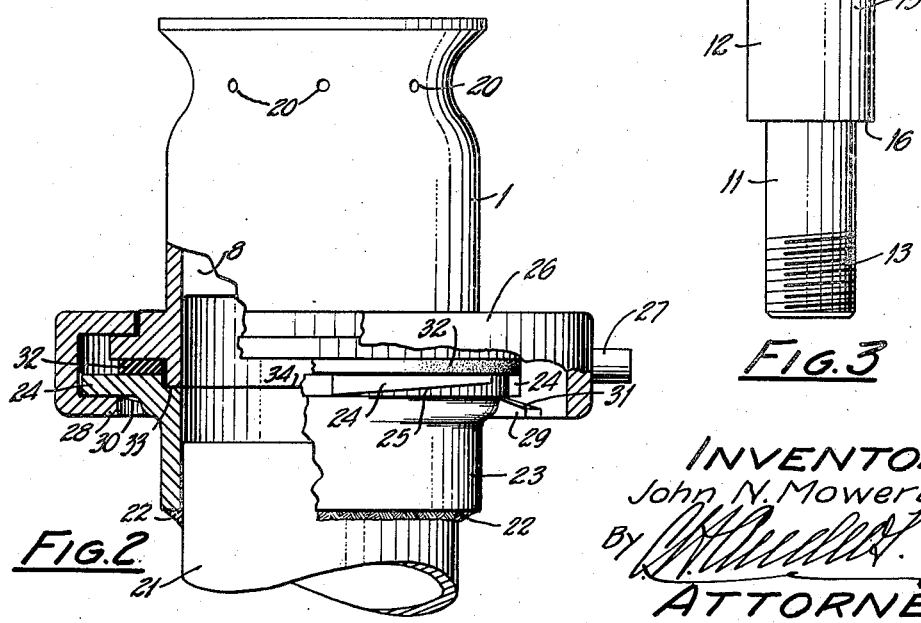
INVENTOR
John N. Mowery
ATTORNEY June 14, 1938.  J. N. MOWERY  2,120,620
SPRINKLER HEAD
Filed March 27, 1936  2 Sheets-Sheet 2

INVENTOR
John N. Mowery
By
ATTORNEY

Patented June 14, 1938

2,120,620

UNITED STATES PATENT OFFICE 2,120,620

SPRINKLER HEAD

John N. Mowery, Worcester, Mass.

Application March 27, 1936, Serial No. 71,096

4 Claims. (Cl. 299—121)

My invention relates to sprinkler heads and particularly to a liquid discharge device of this character which, operating under moderate water pressure, will spray a circular area of substantial diameter and effect a fairly uniform distribution of water throughout said area. It also relates to a device of this character provided with coupling means whereby it may be quickly attached to or detached from a pipe or other source of liquid supply.

In the growing of citrus fruit, oranges and other tropical or semi-tropical fruits, it is necessary, in order to produce the best quality of product, that the trees and the soil between the trees be sprinkled at appropriate intervals. Sometimes it is desirable merely to apply the water to the ground surface around and between the trees for the purpose of washing a fertilizer into the soil, while at other times it is desirable to project the water from elevated heads or nozzles so that the leaves and branches of the trees are thoroughly washed. For such applications, a quickly detachable head is of particular value.

In all cases, the best results are attained with a device which will progressively break up the water into a multiplicity of drops between the sprinkler head and the extreme zone reached thereby rather than with a device from which all the water issues as a sheet and continues in that form for a substantial distance from the head. Most nozzles of which I am aware have this last mentioned defect which results in an undesirable concentration of water in an annular zone more or less remote from the head.

The object of my invention is to provide a device of this character having the desirable features and characteristics mentioned above, and the invention includes the novel elements and the combinations and arrangements thereof described below and illustrated in the accompanying drawings in which—

Fig. 1 is a vertical cross section through the sprinkler head;

Fig. 2 is an outside elevation, partially in section and with portions broken away, showing the sprinkler head coupled to the end of a pipe;

Fig. 3 is an elevation view of an element of my head;

Fig. 4 is a top view of Fig. 3;

Figure 8:
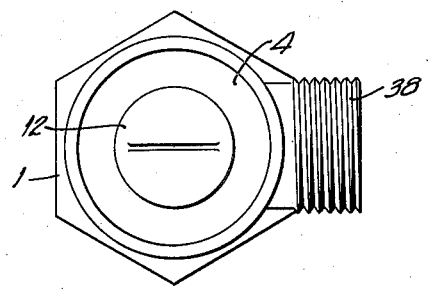
Fig. 8 is a plan view of the nozzle shown in Fig. 7.
Figure 6:
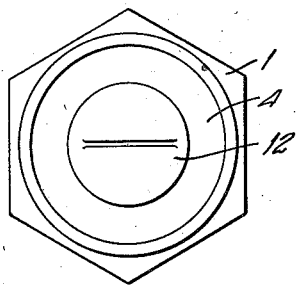
Fig. 6 is a plan view of the nozzle shown in Fig. 5.

Referring to Figs. 1 to 4 inclusive of the drawings, my invention comprises a hollow element 1 preferably generally cylindrical both inside and out and provided, near the bottom thereof, with a circular flange comprising steps 2 and 3. At the top or discharge end, the head terminates in an outwardly flaring frusto-conical surface 4 forming the outer wall of a discharge passage. 5 At the bottom of the frusto-conical surface the discharge passage is cylindrical for a short distance as shown at 5 and, below the cylindrical surface 5, is restricted to a circular orifice 6 of substantially smaller diameter than the cylindrical portion.

The purpose of making the cylindrical portion 5 of larger diameter than the orifice 6 is to eliminate the friction which would result if the outer surface of the issuing jet of water flowed in contact with the surrounding metal. Such friction would appreciably reduce the range of the jet, and by using, as far as practicable, a guiding surface on the inside only of the jet, instead of on both the inside and outside thereof, friction losses are very substantially reduced. Within the hollow element 1 there are transversely extending webs 7 and 8 forming a spider supporting a central boss 9 having an opening 10 therein adapted to receive a stem 11 of a dispersing element 12. The lower end of the stem 11 is threaded, as shown at 13, and projects below the boss 9 a sufficient distance to receive the securing nut 14, as shown in Fig. 1. The element 12 is generally mushroom-shaped, and is provided in the top with a slot 35 adapted to receive a screw driver. The upper portion 15 of the stem is somewhat larger than the lower portion 11 to provide a shoulder 16 which rests on top of the boss 9 and positively positions the element 12 within the hollow body 1. The diameter of the portion 15 is somewhat smaller than the diameter of the orifice 6 in the body 1 so as to provide an annular discharge orifice about the dispersing element in this zone, and the element 12 is of such length that the top thereof is positioned within the frusto-conical surface 4. The exterior surface of the upper portion of element 12 forms the inner wall of the discharge passage and this surface between the cylindrical portion 15 and the top of the element is preferably substantially complementary to a portion of a torus generated by the revolution of a circular arc about the axis of the element 12. The frusto-conical surface 4 is generated by the revolution of a line intersecting the axis of the dispersing element at an angle A, preferably about 45 degrees, and the complementary torus surface of the dispersing element is so positioned relative to the frusto-conical surface that a tangent cone thereto in the zone 17 will intersect the surface 4. One element of such a cone is shown at 18.

While my head as above described performs quite satisfactorily, I find that there is a tendency to form a vacuum within the zone 19, and that by admitting air to this zone through passages 20 in the hollow element 1 the range of the head is very substantially increased. For example, with a water pressure of twenty pounds the diameter of the circle covered by the discharged water is increased about three feet. In addition, with these passages I find that the water discharged is much better broken up and that a much more uniform distribution takes place.

As stated above, where a quick detachable nozzle is desired, I provide the bottom exterior of the element 1 with a flange which cooperates with a coupling element whereby the sprinkler head may be readily attached and detached from the water pipe.

Referring particularly to Fig. 2, such a pipe or tube is shown at 21. This tube has secured thereto by welding, as shown at 22, or otherwise, a flange with three spaced lugs 24 having inclined bottom surfaces 25. These lugs are spaced equi-distant about the periphery of the flange element 23 and are somewhat less than sixty degrees in length so that the spaces between the lugs are slightly greater than 60 degrees.

Cooperating with the flange element 23 and the flange of the head is a locking nut or element 26 provided with spaced peripheral projections 27 whereby it may be gripped by a suitable tool for locking the head to the pipe. The element 26 is annular and provided with an upper continuous inturned flange 27 adapted to pass over the exterior of the element 1 and be centered by the step 3 and rest upon step 2. The bottom of the element 26 is also provided with inturned flange elements comprising three separate sections, two of which are shown at 28 and 29. These inturned flange elements are equally spaced and are somewhat less than 60 degrees in peripheral extent whereby they are adapted to pass through the spaces between the lugs 24 on the flanged element 23. The upper surfaces of these inturned flanges are inclined, as shown at 30 and 31, to cooperate with the inclined surfaces on the bottom of the lugs 24. Between the bottom of the flange 2 on element 1 and the top of lugs 24 is a suitable gasket 32. An annular recess 33 is provided in the end of the flange element 23 which is adapted to receive the lower end 34 of the element 1 and thus center the head over the pipe 21.

When the device is loosely assembled as shown in Fig. 2, the head may be locked to the pipe by merely rotating the element 26 in a clockwise direction. This will effect a wedging cooperation of the inclined surfaces of the lugs on the element 26 with the inclined bottom surfaces 25 of the flange portions 24, and thus compress the gasket and lock the head securely to the pipe.

Figure 7:
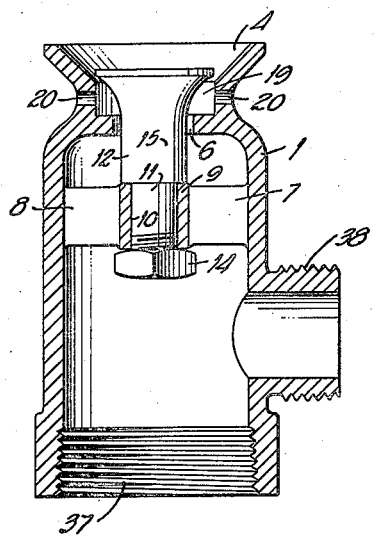
Fig. 7 is a sectional view similar to Figs. 1 and 5 showing a further modification.
Figure 5:
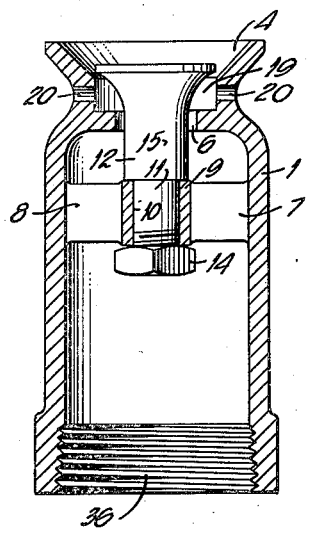
Fig. 5 is a sectional view similar to Fig. 1 showing a slight modification.

In order to uncouple the device it is only necessary to turn the element 26 in a counter-clockwise direction sufficiently to bring the flange elements 28 below the spaces between the lugs 24, whereupon the head together with the element 26 may be lifted from the pipe.

Where it is desirable to eliminate the use of a special coupling, the exterior bottom flanges may be omitted and the interior bottom of the nozzle provided with pipe threads, such as shown at 36 in Fig. 5 and 37 in Fig. 7, whereby it is adapted to be screwed directly onto the threaded end of a pipe of appropriate size.

Where it is desirable to use the nozzle for spraying lawns and the like where the water is conducted to the nozzle through a hose, a threaded hose connection 38 may be provided as shown in Figs. 7 and 8. When used with a hose, the bottom of the nozzle may be closed by a standard plug.

While I have described my invention in its preferred embodiment it is to be understood that the words which I have used are words of description rather than of limitation. Hence, changes within the purview of the appended claims may be made without departing from the true scope and spirit of my invention in its broader aspects.

What I claim is:

1. A sprinkler head of the character described comprising a hollow element having a discharge opening at one end thereof defined by an outwardly flaring wall, a dispersing element centrally positioned in said discharge opening and having a curved outer surface adapted to effect a smooth change in the direction of flow of water passing through said hollow element and to deflect said water against said outwardly flaring wall, and means within said hollow element and cooperating with said dispersing element to form an annular orifice about said dispersing element of less diameter than the interior diameter of said hollow element in the zone between said orifice and said discharge opening, said hollow element being provided with openings for the admission of air to said zone.

2. A sprinkler head comprising a hollow element having an annular discharge orifice, the inner wall of which is a curved surface adapted to deflect the water outwardly, and the outer wall of which is an outwardly flaring surface extending beyond said inner wall and positioned to intercept water deflected thereby, and means within said hollow element forming a restricted annular orifice coaxial with said discharge orifice and in a zone spaced somewhat therefrom; said hollow element being provided with openings for the admission of air to the zone between said orifices.

3. A sprinkler head comprising a hollow element terminating in a flaring, frusto-conical surface forming the outer wall of an annular discharge passage, a dispersing element centrally positioned within said element in spaced relation to said conical surface and forming the inner wall of said passage, and means within said element and near said passage for restricting the flow of liquid to a zone about said dispersing element; said element being provided with means for the admission of air to that zone thereof intermediate said passage and the first mentioned means.

4. A sprinkler head comprising a hollow element having an annular discharge passage, the outer wall of which is a frusto conical surface and the inner wall of which is a surface substantially complementary to a toroidal surface; said complementary toroidal surface extending further into said element than said frusto conical surface; and said element being provided with circumferentially spaced openings for the admission of air in a zone around the inner portion of the complementary toroidal surface.

JOHN N. MOWERY.